United States Patent [19]

Kurland et al.

[11] 4,135,199
[45] Jan. 16, 1979

[54] STIFFENING CONSTRUCTION FOR FACSIMILE CASSETTE

[75] Inventors: Jeffrey B. Kurland, Framingham; Albert W. Miller, Westboro, both of Mass.

[73] Assignee: Alden Research Foundation, Brockton, Mass.

[21] Appl. No.: 783,042

[22] Filed: Mar. 30, 1977

[51] Int. Cl.² ............................................ G03G 17/02
[52] U.S. Cl. ....................................... 346/165; 220/74
[58] Field of Search ...................... 346/165, 153, 145; 220/74, 72

[56] References Cited

U.S. PATENT DOCUMENTS

| | | | |
|---|---|---|---|
| 2,988,258 | 6/1961 | Witzke | 220/74 |
| 3,448,891 | 6/1969 | Czarnecki | 220/74 |
| 3,875,577 | 4/1975 | Alden | 346/165 |
| 3,890,622 | 6/1975 | Alden | 346/165 |
| 3,910,446 | 10/1975 | Dougherty | 220/74 |

Primary Examiner—Jay P. Lucas
Attorney, Agent, or Firm—Grover and Meegan

[57] ABSTRACT

A cassette for a facsimile recorder comprises a plastic housing for a roll of recording web with opposed lips forming an exit path for the web. At least one lip has two parallel ribs pressed in the sheet material extending across the web path so as to stiffen the lip and urge it against the opposite lip and the web in between.

8 Claims, 3 Drawing Figures

STIFFENING CONSTRUCTION FOR FACSIMILE CASSETTE

BACKGROUND OF THE INVENTION

In facsimile recorders of the type shown in U.S. Pat. No. 3,875,577 to John M. Alden, incorporated herein by reference, a web of moist electrolytic recording paper is drawn from a cassette through a recording zone between a linear electrode on the cassette and scanning styli electrodes carried on a belt along the linear electrode with which the styli cooperate to mark the paper with graphic signals corresponding to electric facsimile or like signals applied to the two electrodes.

Whether the scanning electrodes are styli as in the above cited patent or a helical electrode on a rotating drum as in the copending application Ser. No. 751,649 of John M. Alden, the present invention relates to an improvement of the cassette enclosing the recording web supply.

STATEMENT OF INVENTION

According to the invention a cassette for a facsimile recorder including a scanning electrode for marking a web drawn from the cassette, the cassette comprises a housing for holding a supply of recording web including a web holding supply compartment and two opposed lips of sheet material forming a web exit path from the compartment, the lips being connected to each other at each side of the exit path, and at least one lip having a ridge formed therein and extending across the web path so as to urge said one lip toward the other lip and press against the web therebetween.

DRAWING

DESCRIPTION

Figure 1:
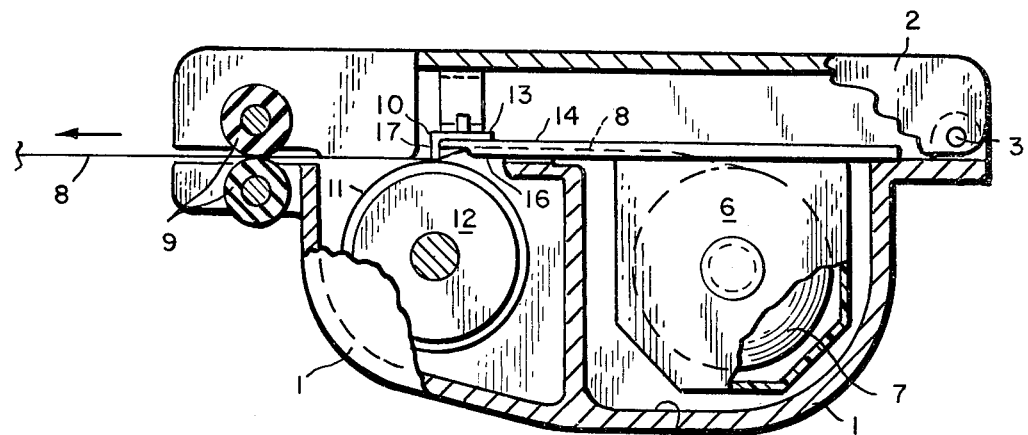
FIG. 1 is a side elevation of a facsimile recorder receiving a cassette according to the invention.

The facsimile recorder of FIG. 1 comprises a base 1 to which a cover 2 is hinged at a pivot 3. The base has a well 4 receiving a cassette 6 of sheet plastic holding a roll 7 of moist electrolytic paper or like recording web whose leading end 8 is drawn from the cassette through opposed lips 14 and 16 by feed rolls 9 driven by a suitable motor. The web end 8 passes between a linear electode 10 and a well known helical electrode 11 curved around a rotating drum 12, the two electrodes cooperating to mark electrical signals on the web as is well known in the facsimile art.

The linear electrode 10 is L-shaped with the long leg 13 of the L adhered to the upper cassette lip 14 which, with the lower lip 16 forms an exit path for the web from the cassette 6. The shorter leg 17 of the L-shaped linear electrode extends nearly at right angles to the longer leg 13 toward the path of the recording web 8.

Figure 2:
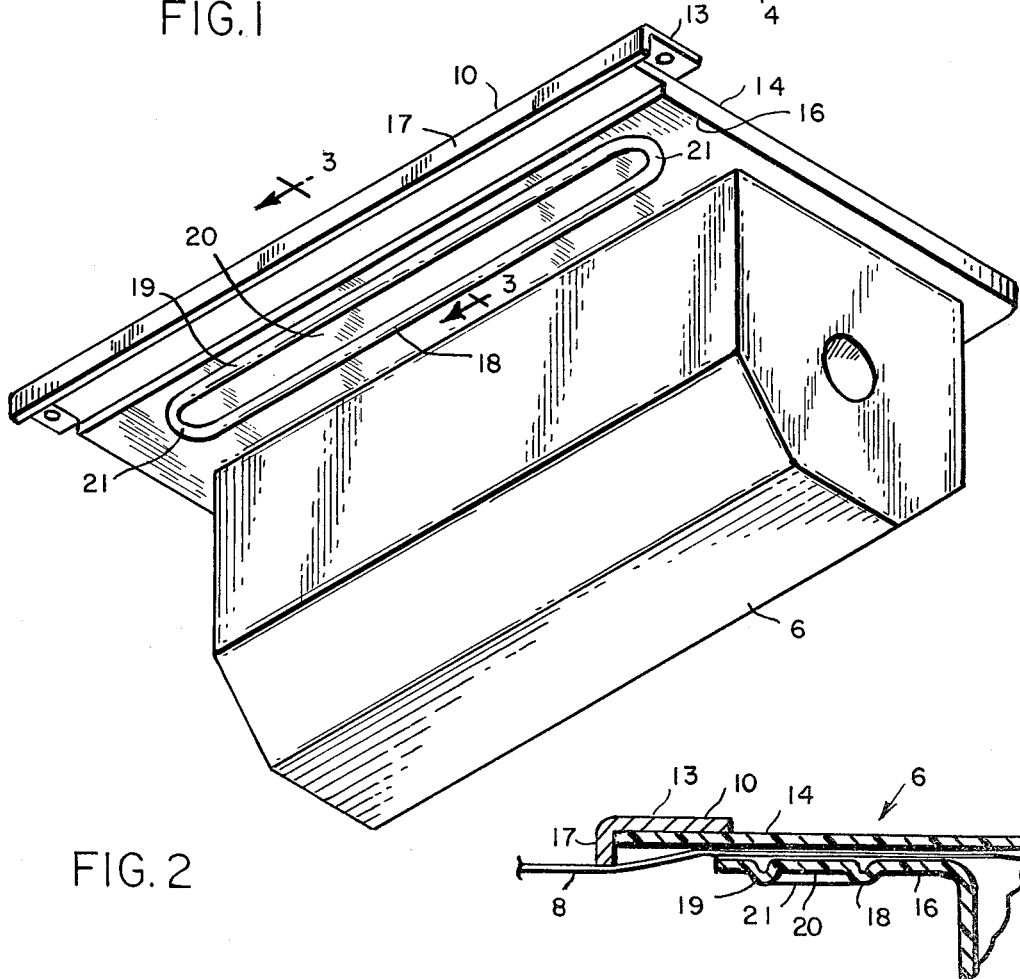
FIG. 2 is an underside isometric view of the cassette.
Figure 3:
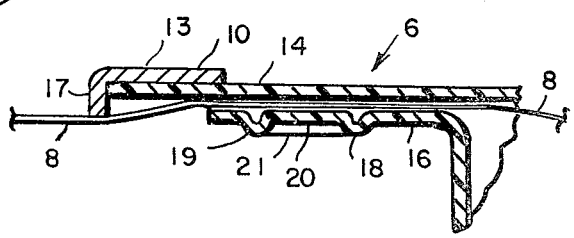
FIG. 3 is a section on line 3—3 of FIG. 2.

The present invention concerns one or more ridge indentations in either one of the cassette exit lips 14 and 16. As shown in FIGS. 2 and 3 two parallel ridges 18 and 19 are formed downwardly in the lower lip 16. These ridges individually comprise stiffening members which extend so as to urge the lower lip 16 toward the upper lip 14 substantially entirely across the path of the recording web 8. The ridges 18 and 19 are reinforced by connecting arcuate end ridges 21 continuous with straight ridges 18 and 19, and surround a flat 20 extending between the two ridges 18 and 19. The ridges 18 or 19 also hold the web 8 in a plane parallel to the linear electrode. Further the connecting flat 20 is pressed by the ridges 18 and 19 against the upper lip 14 so as to apply back tension against withdrawal of the web 8 by the feed rolls 9, and additionally seal the cassette against the escape of moisture.

It should be understood that the present disclosure is for the purpose of illustration only and that this invention includes all modifications and equivalents which fall within the scope of the appended claims.

We claim:

1. A cassette for a facsimile recorder including a scanning electrode for marking a web drawn from the cassette, the cassette comprising:
   a housing for holding a supply of recording web including a web holding supply compartment and two opposed lips of sheet material extending outwardly from said web holding supply compartment and forming a web exit path from the compartment,
   the lips being connected to each other at each side of the exit path, and
   a ridge formed on at least one lip, said ridge being disposed on said lip intermediate the supply compartment and the exit and extending across the web path so as to urge said one lip toward the other lip and press against the web therebetween, whereby said lip is strengthened and back tension is applied to the recording web and the cassette is sealed against the escape of moisture from the web supply compartment.

2. A cassette according to claim 1 including a linear recording electrode on one of the lips extending across the web path beyond the ridge such that the ridge holds the web in a plane parallel to the electrode scan.

3. A cassette according to claim 1 wherein the cassette is formed of sheet plastic in which the ridge is indented.

4. A cassette according to claim 1 including a ridge parallel to the aforesaid ridge.

5. A cassette according to claim 4 wherein the parallel ridges are joined at their ends by a connecting ridge.

6. A cassette according to claim 4 wherein the ridges have a flat extending between them which they press toward the other lip thereby to apply back tension against withdrawal of the recording web.

7. A cassette according to claim 6 wherein the cassette contains a supply a moist recording web and the flat pressure seals the cassette against the escape of moisture.

8. A cassette according to claim 1 wherein the cassette contains a roll of moist electrolytic recording web.